United States Patent
Wiemers

(10) Patent No.: US 6,292,998 B1
(45) Date of Patent: Sep. 25, 2001

(54) METHOD AND APPARATUS FOR PROCESSING WORKPIECES AND ASSEMBLING AND DISASSEMBLING OF STRUCTURAL UNITS

(75) Inventor: Karl-Heinz Wiemers, Ebendorf (DE)

(73) Assignee: w.i.t.—Wiemers innovative Technik GmbH., Barleben (DE)

( * ) Notice: Subject to any disclaimer, the term of this patent is extended or adjusted under 35 U.S.C. 154(b) by 0 days.

(21) Appl. No.: 09/370,428

(22) Filed: Aug. 9, 1999

(30) Foreign Application Priority Data

Aug. 7, 1998 (DE) .............................................. 198 35 740

(51) Int. Cl.[7] ...................................................... B23Q 7/00
(52) U.S. Cl. .................................................. 29/559; 269/8
(58) Field of Search ................................... 269/8, 71, 72, 269/73, 21; 29/559

(56) References Cited

U.S. PATENT DOCUMENTS 4,399,988 * 8/1983 De Shong .................................. 269/8
4,448,403 * 5/1984 Riessland ................................. 269/21
5,745,970 * 5/1998 Sakashita et al. ................. 29/407.05
5,828,224 * 10/1998 Maruyama ............................ 324/755
5,944,079 * 8/1999 Yamauchi .......................... 144/286.5

* cited by examiner

Primary Examiner—Joseph J. Hail, III
Assistant Examiner—Daniel Sharley
(74) Attorney, Agent, or Firm—Karl Hormann

(57) ABSTRACT

A method and an apparatus for performing mechanical operations on a workpiece secured on a first member for movement relative to a second member in at least one of three orthogonal directions at a precision in the $\mu$m range. Selectively energizable magnets are provided between the first and second members cause the first member to assume a floating state relative to the second member and to provide such movement. The second member is provided with a chamber for receiving the first member and is with openings for the controlled flow of pressurized fluid to augment the action of the magnets.

12 Claims, 8 Drawing Sheets

METHOD AND APPARATUS FOR PROCESSING WORKPIECES AND ASSEMBLING AND DISASSEMBLING OF STRUCTURAL UNITS

BACKGROUND OF THE INVENTION.

1. Field of the Invention.

The invention, in general, relates to a method and an apparatus for mechanically processing of workpieces and for assembling and disassembling of structural units and, more particularly, to an apparatus in which workpieces to be processed, or structural units to be assembled or disassembled, as the case may be, are secured on an adjustable and, optionally, removable clamping tray of the kind integrated in such machine tools as, for instance, CNC-controlled grinding machines, milling machines, boring mills and the like, or utilized in transfer lines for assembling or disassembling structural units.

2. The State of the Art.

To reduce idle times during mechanical processing, assembly or disassembly operations, and to increase productivity and manufacturing capabilities, it is common practice to incorporate individual machine tools or even entire machine systems into assembly or disassembly lines. Proposals aimed at satisfying these requirements have not been lacking. They have been addressed to such operations as securing and releasing workpieces on workpiece clamping trays, aligning workpieces relative to processing tools, positioning workpieces for purposes of processing, as well as to motors accommodating such operations.

For instance, German patent DE 21 02 234 A1 relates to a drive for moving, within an assembly line, tool supports into predetermined positions in a transport path. To this end, a plurality of primary and secondary components of conventional linear motors is used cooperating alternatingly and by pulsed energization. The primary components are disposed in spaced relationship along a transport path, either singly or in groups. The secondary components are mounted on the tool support.

Grouped primary components are aligned either in parallel or angularly with respect to each other, and predetermined primary groups are connected in a consecutive sequence to a source of three-phase or direct current by means of switches actuated by the tool support. Each the secondary components consists of a plate of high magnetic conductivity and, when facing a primary component, and which is covered by an electrically highly conductive plate. Both secondary components are longer than any one of those primary components which are disposed in the same manner as they are.

Two parallel strips of high magnetic conductivity are embedded in the plate of high electric conductivity and extend laterally thereof. Each one of the strips is wider than the width of notches of the primary components and the center spacing between them which corresponds to the spacing between two opposite poles of the primary components.

In such an arrangement an air cushion is built up between the tool support and the transport path, and a conventional linear motor is utilized as a drive.

Clamping or lifting of workpieces by means of a magnetic clamping tray is known from European patent EP 0,357,904 A1 which describes a magnetic clamping tray capable of securely retaining not only workpieces made from different materials, but also workpieces made from weakly and non-magnetic materials. Its surface is structured such that it supports a workpiece in any position; at the same time it ensures appropriate vacuum pressure by an unimpeded air flow.

Two embodiments are described. In one embodiment slots or bores are formed in the magnetic pole sections between pole conduits which are made of non-ferromagnetic material and which are filled with a fine porous sintered metal.

In the other embodiment, the slots are provided in the pole conduits and are also filled with a fine porous sintered metal which in this case, however, is not ferromagnetic.

While it is possible magnetically to secure a workpiece with the described combination vacuum and magnetic clamping tray, it is not possible, for instance, to align or move a workpiece provided on the magnetic clamping tray.

Furthermore, German patent DE 196 28 921 A1 discloses a machine tool system for mechanical operation which consists of a machine base in operative connection with a gantry supported laterally of the foundation of the machine and extending over the machine base. The base of the machine is provided with a bed for receiving and supporting a clamping device. The receiving bed may be moved in the direction of the longitudinal or x-axis of the machine.

The receiving bed is provided with a clamping device which may be magnetically supported, arrested and positioned and which workpieces to be secured on the clamping tray. The entire clamping device may be magnetically lifted, moved and positioned. It may also be lowered and magnetically clamped, preferably by hybrid magnets, on the receiving bed.

It is also known to structure the clamping tray of such a clamping device for movement and adjustment not only along its x and y axes, but also for angular movements and adjustments about its vertical axis, by appropriate lifting and adjustment devices.

In these known arrangements, lifting magnets move the clamping devices with workpieces placed thereon are put into a floating state which state they may be adjusted, positioned and lowered to be secured by arresting magnets. With the clamping tray in this lowered and secured position, the workpieces may be subjected to defined processing operations.

It is an object of the invention to provide a method and an apparatus capable of performing mechanical processes and operations on workpieces and of assembling or disassembling, as the case may be, structural units, and of positioning workpieces or structural units placed on a clamping tray of a machine system relative to tool systems, assembly devices, processing systems and the like which are disposed on one or more gantries which extend over, or are arranged around, the clamping tray.

SUMMARY OF THE INVENTION.

In a currently preferred embodiment there is provided a method of performing mechanical operations on workpieces and of handling structural units to be assembled or disassembled in which the workpieces or structural units are secured on fixed or removable workpiece clamping trays which as part of a clamping device or turntable may be supported in a floating state, adjusted and positioned by magnetic forces and/or pneumatic and/or hydraulic media. The workpieces secured on the clamping tray may be subjected to rotational processing in the floating as well as in the lowered position of the clamping device or of the rotor of the turntable. A sensor system is provided for ensuring no contact between the support elements of the clamping tray and a magnetic support ring or between the support elements of the rotor with its clamping tray and the housing of the turntable. Positioning of the workpieces or structural units relative to tool, assembly or disassembly systems at a precision in the pm range is ensured by a measuring and closed-loop control system. Direct angular positioning and measurement of rotational velocity and indirect measurement of the acceleration of the rotor are provided by an angle measuring device.

The apparatus in one embodiment of the invention is structured as a clamping unit consisting of a base plate with an associated support ring provided with a device for adjusting the angle of inclination which in turn is connected to a centering plate and a workpiece clamping tray by means of adjustment spindles. The base plate which may be a solid plate or a ring is disposed within a magnetic support ring provided with an apertured medium chamber and a nozzle system consisting of individual nozzles arranged around the periphery of the magnetic support ring.

In another embodiment of the invention there is provided a turntable consisting of a housing, a magnetically supported rotor including a fixed or removable clamping tray, lifting magnets, arresting magnets, centering magnets, a linear motor as well as an angle measuring device and a sensor system.

Advantageously, the method in accordance with the invention provides for mechanically processing, treating, coating, assembling or disassembling and the like of workpieces or structural units arranged upon a clamping tray mounted on a turntable or on a clamping device, the positioning and adjustment of which relative to tool, processing, assembling and disassembling systems are carried out in a floating state of the turntable support and associated turntable and/or of the rotor of the turntable as well as the entire clamping device, whereby magnets and/or a pressurized pneumatic or hydraulic medium cushion is provided for generating or supporting the floating state of the turntable rotor within the housing of the turntable or of the turntable support with the turntable or clamping device disposed thereon.

The mechanical processes, treatments, coatings, assembling or disassembling and the like of the workpieces and/or structural units may be performed in or by concentric, eccentric or curved path arrangements. In a concentric arrangement, the fixed or optionally removable clamping tray rotates about its vertical and magnetically supported axis of rotation, the clamping tray being connected to the rotor of a turntable. The rotor is magnetically supported within the housing of the turntable. The turntable support, in turn, is magnetically supported in a mechanical guide structure.

Rotation and angular positioning of the rotor maybe accomplished mechanically or by synchronous or asynchronous linear motors. The rotation may be imparted by forces acting on a flange surface from below or above a horizontal plane, or on an offset surface of the rotor, as well as on a vertical plane, for instance, on the outer cylindrical surface or internal bore of the rotor or on the outer periphery of the rotor flange.

In a concentric movement, vertical and horizontal magnetic adjustments of the clamping tray are undertaken solely to adjust the floating, i.e. the rotational movement of the rotor within the turntable at a precision in the $\mu$m range and to maintain the horizontal as well as vertical magnet gaps, so that any engagement of the rotor with the inner wall of the turntable housing is prevented even under static and dynamic tilting moments, operational forces and the like.

During concentric movements of the clamping tray the floating state of the rotor in the turntable housing may be augmented by an arrangement of magnets of identical polarity between the lower surface of the rotor and the opposite base surface of the turntable housing.

By the concentric self-propelled movement of the clamping tray the workpieces secured thereon may be positioned with great precision relative to any machine tool systems which are movable in the direction of their x axis, i.e. their longitudinal axis, and which are mounted on gantries or near the machine, by rotational movement of the clamping tray in angles $\phi$ relative to the vertical z axis as well as to the y axis and the x axis of the turntable support, so that tool systems which may or may not be provided with their own drives can operate upon the workpieces.

As has been mentioned supra, the clamping tray which may either be fixed or removable may be part of a clamping device or of a turntable. In such an arrangement, too, the workpieces positioned on the clamping tray may either be fixed by the clamping device or by the turntable rotor, or moved around the rotational axis of the clamping device or of the turntable rotor. The clamping device or the turntable rotor including clamping tray may be moved in a conventional or magnetically supported manner toward static tool systems for attaining any required position in a highly exact manner by rotational movement and movement along the x axis. Thereafter, the static or movable tool system provided with its own rotational and/or vertical drives, may act upon workpieces on the clamping tray, while the workpieces are moved along the x, y-$\phi$ axis of the clamping device or the $\phi$-y axis of the turntable rotor and the x axis of the turntable support. A combination of the x/y-$\phi$ axial movement of the tool systems with the x-y-$\phi$ rotational movements of the clamping device or of the turntable rotor in connection with the turntable support is possible as an additional movement along the z axis of the tool systems and the omni-angular vertical movement of the described apparatus.

Another alternative use of the described apparatus relates to mechanical processing of workpieces in a machine tool by the omni-angular vertical movement of a receiving plate of a machine tool which is moveable along its x axis and upon which workpieces are secured, in combination with the use of the described clamping device or turntable as a tool system support at a gantry of the machine tool, in which several tool systems are moved concentrically or along curves, as has been mentioned supra, and are acting upon the workpieces on the clamping tray.

In eccentric movements along the workpieces, adjustment and positioning of the clamping device or of the turntable and clamping tray are carried out along the x axis of the system. This leads to curved paths which result from a combination of rotational and planar displacements and are provided by means of magnetic lifting, driving and arresting forces as well as by additional pneumatic and/or hydraulic media. In this connection, it is possible following each positioning of the workpieces/structural units with respect to the mentioned systems and apparatus to clamp the base plate of the clamping device against the magnetic support ring which embraces the clamping device, or the turntable rotor against the base plate of the housing of the turntable, and thus to secure the clamping tray against movements which may result from the operation and to push back any additional medium. It is also possible during processing, assembly or the like to move the clamping tray in horizontally and vertically curved paths in the magnetic gap between the base plate of the clamping device and the internal bottom surface of the magnetic support ring, or between the turntable rotor and the base plate of the housing of the turntable, with a supportive pneumatic and/or hydraulic medium reinforcing the magnetic gap, without any need in the interim for clamping the base plate against the magnetic support ring. To this end, all movements of the clamping device and of the clamping tray are controlled by an integrated CNC system.

The necessity of the base plate which is part of the clamping device not physically engaging the magnetic support ring when the clamping device is in its elevated state, or the turntable rotor in the housing of the turntable not contacting the turntable support, is monitored and ensured by a sensor system. A measuring system ensures that adjustments of the clamping tray, of the clamping device as well as of the turntable, are performed with a precision in the $\mu$m range.

To this end, the method has been conceptualized such the requisite method steps may be performed singly or in combination with each other. Accordingly, the vertical positions of the base plate of the clamping device or of the rotor of the turntable may be set by magnetic forces, by added media, preferably air, or by a combination of magnetic forces and/or fluid media. Furthermore, it is possible to process, treat, assemble or disassemble the workpieces or structural units while the clamping device or the turntable is in a floating state for omni-directional positioning or movement as well as when it is in its lowered position, i.e. when it engages the magnetic support ring or the base plate of the turntable housing, or when the turntable support is connected to its mechanical guide system.

Moreover, for purposes of assembly or disassembly, the clamping device or the turntable support including the turntable may be part of a given machine system, and may thus be arranged, for instance, in a foundation pit or in a transfer path.

Machine gantries equipped with tools, processing, assembly or disassembly systems may move along the x axis across the entire clamping device or turntable support including the turntable and, hence, across the workpieces or structural units secured on the clamping tray.

The clamping device which may be magnetically supported, secured and positioned, or the rotor of the turntable, including any workpieces or structural units placed on the clamping tray, is elevated, moved, positioned and lowered by magnetic forces and/or pneumatic and/or hydraulic media. The clamping device or the rotor of the turntable is magnetically arrested or secured, preferably by hybrid magnets. The clamping device is mounted in a magnetic support ring embracing the base plate of the clamping device, or the rotor of the turntable is mounted in the housing of the turntable. Lifting, arresting and drive or propulsion magnets are provided in the magnetic support ring; centering magnets are additionally provided in the turntable housing. The drive magnets preferably constituted as linear motors ensure that the workpieces or structural units placed on the clamping tray are moved and positioned relative to tools, processing, assembly or disassembly systems and the like when the clamping device or the turntable or its support are in their floating state.

The play or tolerance between the magnetic support ring and the base plate of the clamping unit, as well as the free space between the magnetic support ring and the support ring of the clamping device are selected such that the entire clamping device may be moved or positioned rotationally or in a plane, i.e. about its z axis and in the direction of the x and y axes, depending upon the required position of the workpieces relative to the tools and processing system, or upon the requisite positions of the structural units relative to the assembly or disassembly systems.

In the concentric arrangement of turntable and turntable support the rotational $\phi$ angle position relative to the z axis and, hence, the relative y axis is set by the turntable rotor. Positioning along the x axis is carried out by the turntable support.

Thus, the apparatus in accordance with the invention consists of a clamping device provided with a base plate, a support ring, a clamping tray as well as a magnetic support ring which embraces the base plate of the clamping device. The magnetic support ring is operatively connected to the clamping device and is equipped with lifting, arresting and drive magnets.

In a concentric arrangement of a turntable housing and a rotor, a clamping tray with a turntable support operatively connected with the turntable, the turntable support is movable along its x axis and is equipped with lifting, arresting and guide magnets. The turntable is also provided with lifting, arresting and drive magnets as well as additional centering magnets so that, with the turntable rotor and the turntable support, it may perform the rotational $\phi$ angle movement about the z axis or the movement relative to the y axis while always precisely maintaining the vertical and horizontal system axis of the entire arrangement.

In addition, nozzle openings are provided for feeding and removing pneumatic and/or hydraulic media, for lifting the entire clamping system or turntable rotor or to aid in their floating state. Where the clamping device or the turntable rotor is magnetically clamped against its magnetic support ring or base plate of the turntable housing, respectively, the corresponding medium is pushed back to the internal base surface of the magnetic support ring by the weight of the clamping device and the magnetic clamping forces.

Movement and positioning take place when the clamping device or the turntable rotor is in its lifted or floating state; for the lifting magnets and/or the medium (gas, liquid, and the like) raise the clamping device or the turntable rotor off the base surface of the magnetic support ring or the base plate of the turntable housing such that defined gaps are formed between the lower surface of the base plate and the inner bottom plate of the magnetic support ring or between the lower surface of the turntable rotor and the base plate of the turntable housing as well as between the upper surface of the base plate and the internal upper surface of the magnetic support ring or the upper surface of the turntable rotor and the turntable housing lid, so that the necessary movement and positioning steps of the clamping tray may be performed without the base plate or the turntable rotor contacting anything. The base plate of the clamping device may be structured either as a solid plate or as a ring.

BRIEF DESCRIPTION OF THE SEVERAL DRAWINGS

The novel features which are considered to be characteristic of the invention are set forth with particularity in the appended claims. The invention itself, however, in respect of its structure, construction and lay-out, as well as manufacturing techniques, together with other objects and advantages thereof, will best be understood from the following description of preferred embodiments when read with reference to the appended drawings, in which:

DETAILED DESCRIPTION OF THE PREFERRED EMBODIMENTS.

As well as individual pieces the term "workpiece" as used herein is intended to connote structural units consisting of a plurality of individual pieces. The term "mechanically processing" and any derivatives thereof is intended to mean any mechanical operation which may be performed on a workpiece, including, but not limited to, assembly and disassembly operations, and which requires a precise alignment of the workpiece relative to a tool.

Figure 1:
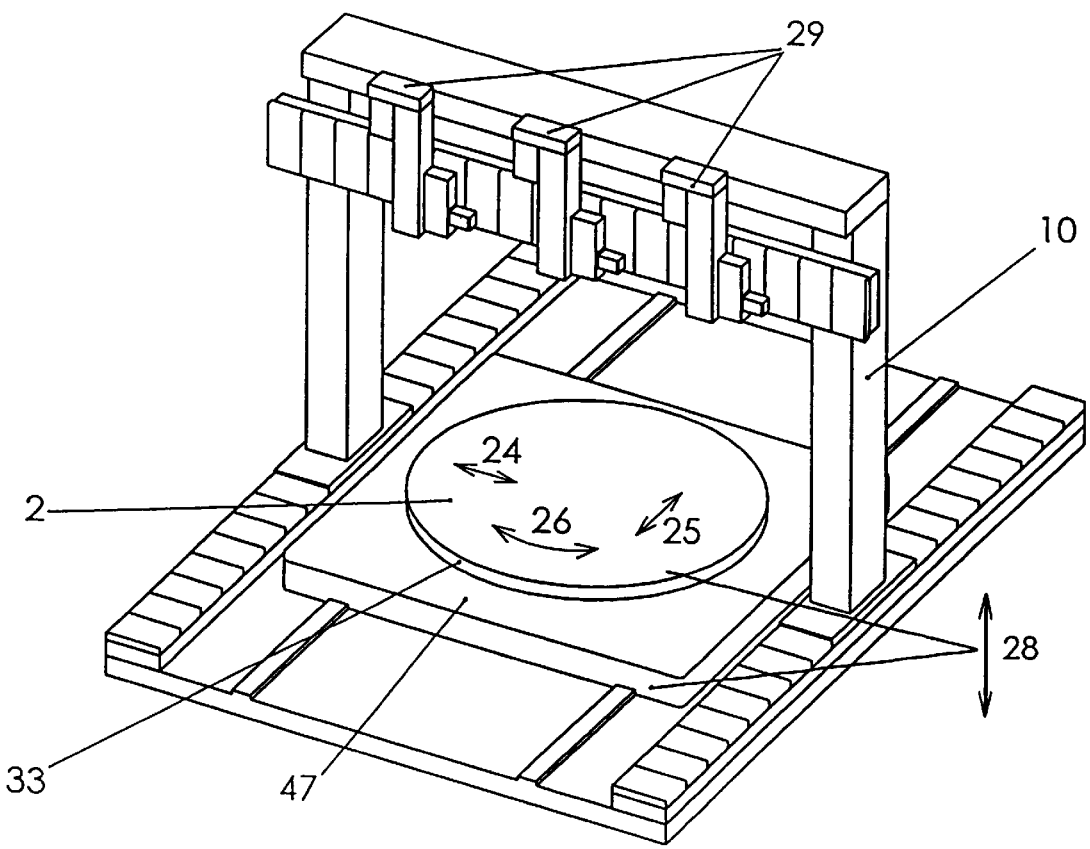
FIG. 1 is schematic presentation in a perspective rendition of a machine tool system including turntable and turntable support.
Figure 2:
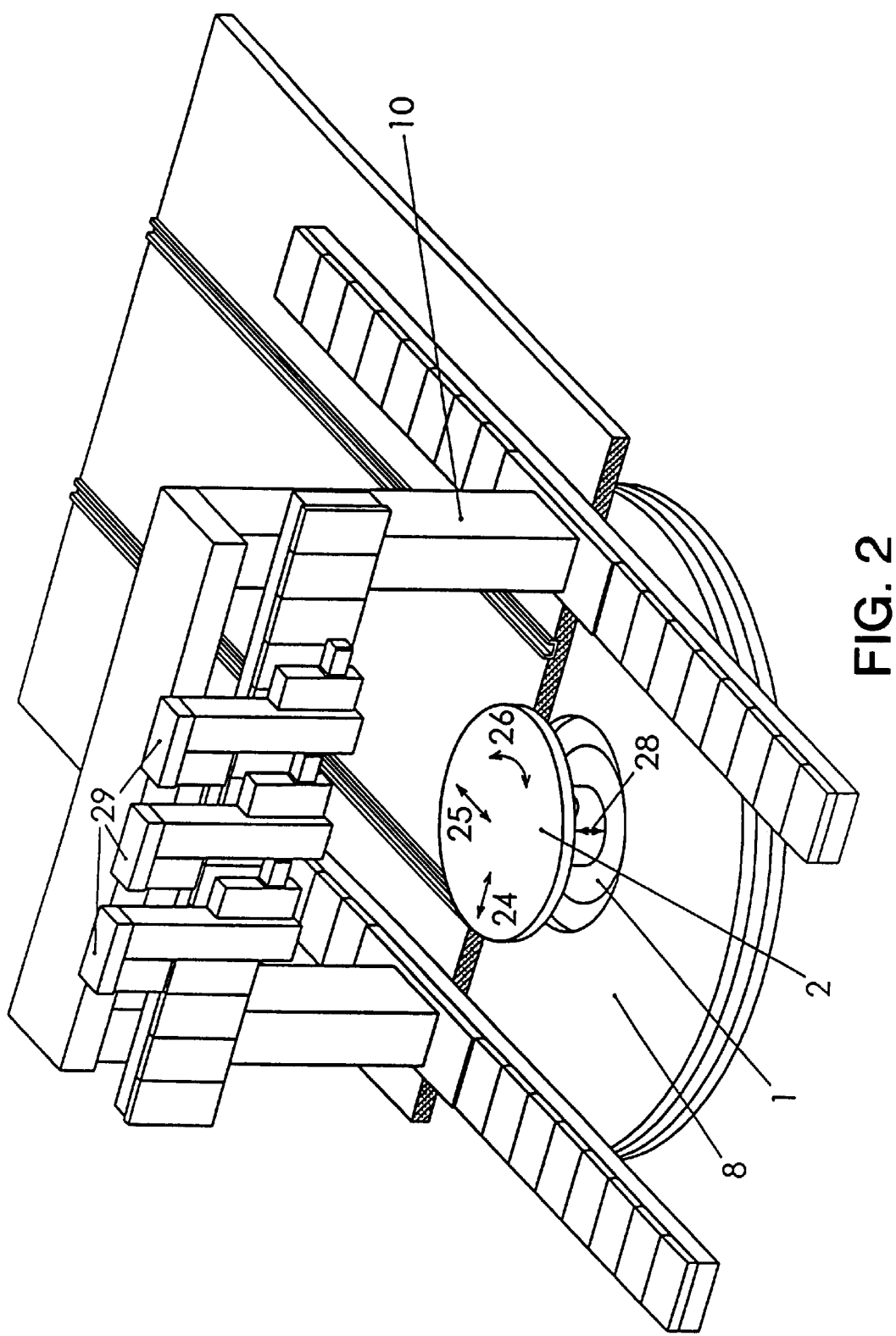
FIG. 2 is an overall view in perspective of a machine tool system including a clamping arrangement.

FIG. 1 depicts a turntable 33 including a clamping tray 2 and a turntable support 47 integrated and arranged in a complete machine tool system. Integration and arrangement of a clamping device 1 and associated clamping tray 2 are shown in FIG. 2. The figures also indicate the directions 24, 25, 26, 28 in which the clamping tray 2, whether it be part of a turntable 33 and turntable support 47 or of a clamping device 1, may be moved. The clamping tray 2 will be understood by persons skilled in the art to constitute a support configured for securely holding a workpiece in a predetermined position. They also show the gantry 10 of the machine extending over the clamping device 1 or over the turn table 33. The gantry 10 supports a plurality of tools schematically depicted as being mounted in brackets 29. The tools are positioned to perform unspecified operations on workpieces (not shown) secured on the clamping tray 2.

Figure 3:
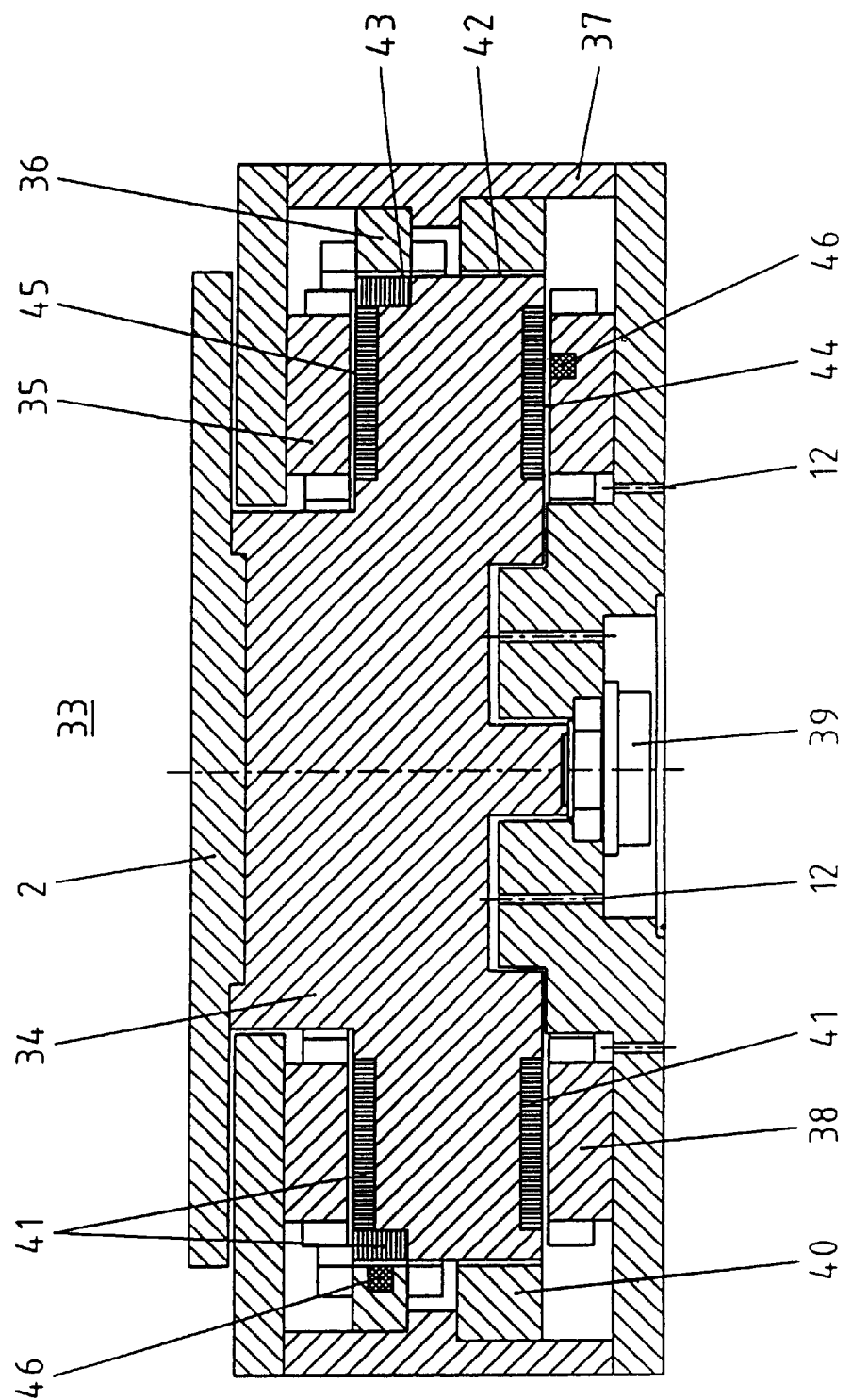
FIG. 3 is a view in axial section of a turntable.

FIG. 3 depicts the structure and configuration of a turntable 33 in accordance with the invention. The turntable 33 is configured as a compact unit consisting of a housing 37 within which there is provided a rotor 34. The clamping tray 2 may either be affixed on the rotor 34 or it may be removably placed thereon.

In addition, the turntable 33 is provided with lifting magnets 35 and arresting magnet 38. The lifting magnets 35 are disposed above the rotor 34 and are affixed to a lid of the housing 37. The arresting magnets 38 are arranged below the rotor 34 on a bottom plate of the housing 37.

In addition, the turntable 33 is provided with centering magnets 36 and with a rotationally acting linear motor 40 which are disposed around the periphery of the rotor 34 in an internal wall of the housing 37. In the vicinity of the lifting magnets 35, the arresting magnets 38 and the centering magnets 36, the rotor 34 is preferably provided with sheet-metal zones 41 for increasing its magnetic efficiency. It will, however, be appreciated by those skilled in the art that the magnets 35, 36, 38 may act directly on the rotor 34. Whether the rotor 34 is provided with sheet-metal zones or not depends upon the magnetic properties of the rotor 34.

Air gaps 45, 44 and 43 are provided in the zones in which the lifting magnets 35, the arresting magnets 38 and the centering magnets 36 act on the rotor 34. These gaps also constitute magnetic gaps which are needed for positioning and rotating the rotor 34 and for its horizontal and vertical adjustment. Furthermore, an air gap 42 is provided between the linear motor 40 and the rotor 34, the rotor 34 being provided with permanent magnets (not shown) in the effective zone of the linear motor 40 to act as the secondary components thereof.

The turntable 33 is also provided with a device 39 for measuring the rotational angle. The device 39 is operatively connected to the rotor 34 and is structured to provide for an exact angular positioning and measurement of the angle φ of rotation of the clamping tray 2. The device 39 may also be used for direct measurements of the rotational velocity of the clamping tray 2 and for indirect measurements of its acceleration.

The action of at least some of the magnets referred to supra may be augmented by gaseous or liquid media. To this end, the housing 37 is provided with openings in which nozzles 12 are seated which serve to admit and to remove such media.

The turntable 33 is also provided with sensors 46 which are positioned close to the centering magnets 36 and the arresting magnets 38 and which serve to measure the air gaps 43 and 44.

Furthermore, the turntable 33 is provided with a catch (not shown) for preventing the rotor 34 in case of a malfunction, such as, for instance, a current failure) from touching any one of the arresting magnets 38, centering magnets 36 or linear motor 40 and for preventing damage to the turntable 33.

Figure 4:
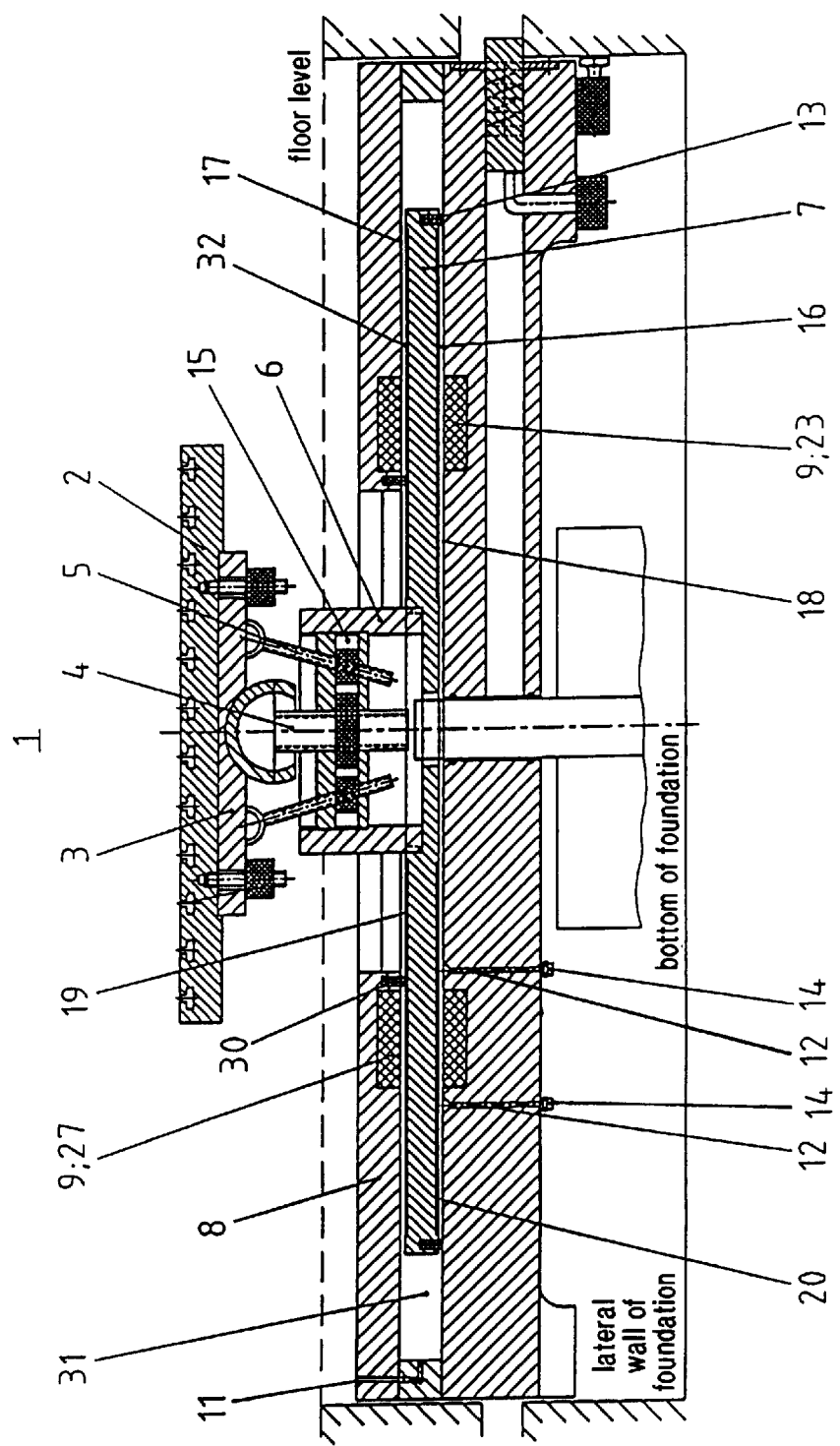
FIG. 4 is a view in axial section of a magnetic support ring including a clamping device and the support of the ring in a pit of a foundation.
Figure 5:
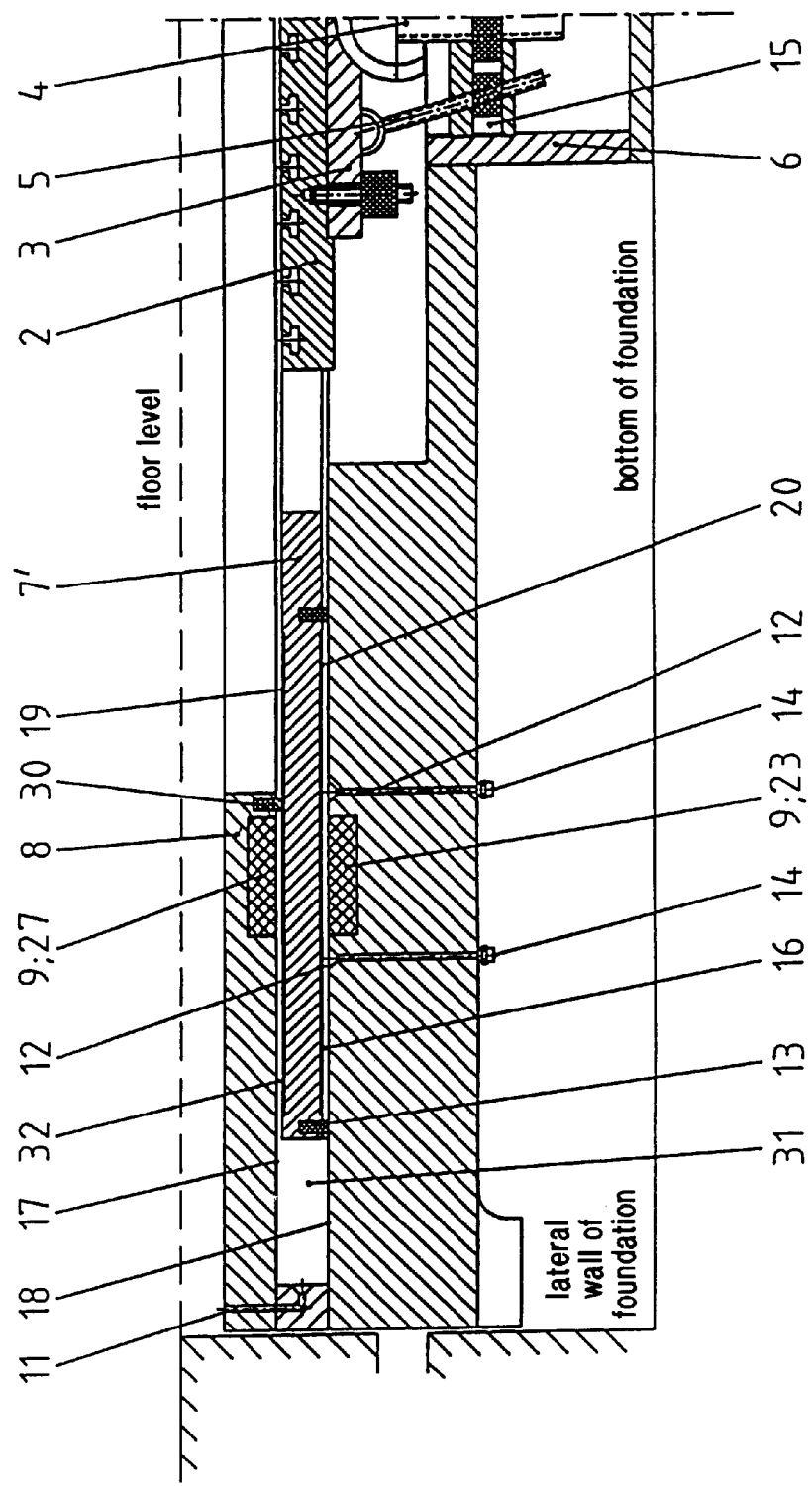
FIG. 5 is the left portion of an axial section of an alternative embodiment of a clamping device having an annular base plate.

The structure of a clamping device 1 and its support in a magnetic support ring 8 as well as their placement within a pit of a foundation have been depicted in FIG. 4. The clamping device 1 consists of a base plate 7 which but for an axial opening is structured as a solid plate. As shown in FIG. 5, the base plate may optionally be structured as a ring 7'. A support ring 6 is affixed to the base plate 7 and an angular inclination device 15 is mounted in the support ring 6. The angular inclination device 15 is provided with a plurality (two shown) of level setting spindles 5. A ball at the end of a spindle 4 is seated in a concave recess of a centering plate 3 and serves as a fulcrum for the clamping tray 2 affixed to, or optionally releasably mounted on, the centering plate 3. By lengthening and shortening the spindles 5 relative to the ball and socket, the angular inclination of the clamping tray 2 may be set. Releasable mounting of the clamping tray 2 on the centering plate 3 offers the advantage that the tray, and any workpieces placed thereon, may be moved to other processing machinery, unloading or storage facilities, as the case may be.

The clamping device 1 is supported by the base plate 7 which is mounted within a chamber 31 of a magnetic support ring or cage 8 such that is may be lifted, adjusted or lowered therein without any impediment. To this end, the chamber 31 is dimensioned appropriately.

The magnetic support ring 8 is provided with a bottom surface 18. Arresting magnets 23 and drive magnets 9 are seated within the surface 18; and in the upper internal surface 17 of the ring 8 there are provided lifting magnets 27 as well as drive magnets 9. Preferably, the support and the lifting magnets 23, 27 are hybrid magnets, i.e., they are made from a combination of electromagnets and permanent magnets.

The drive magnets 9 preferably are structured as linear motors by means of which the base plate 7 may be rotated and moved along a plane. A sensor system (not shown) is provided to ensure that the base plate 7 stays out of physical contact with the magnetic support ring 8, by maintaining gaps 16, and 32 between the inner upper surface 17 of the ring 8 and the upper surface 19 of the base plate 7 as well as between the lower surface 20 of the base plate 7 and the bottom surface 18 of the ring 8.

When the base plate 7 is in its elevate or floating state, the entire clamping device 1 can be adjusted and positioned with an integrated measuring system ensuring that the clamping tray 2 and any workpieces or structural units placed thereon, are positioned with a precision in the um range relative to tools which may be mounted in brackets 29 as shown in FIG. 2.

The arrangement of the base plate 7, 7' as shown in FIGS. 4 and 5 within the magnetic support ring 8 displays the floating state of the entire clamping device 1 as well as the arrangement and cooperation of individual components. In praxi, i.e. during an operation, the entire clamping device 1, by way of its base plate 7, 7', will either rest on the bottom surface 18 of the magnetic support ring 8 or float between the upper surface 17 and the bottom surface 18 of the magnetic support ring 8. This state is achieved by moving the base plate 7, 7' into this position, either by way of the lifting magnets 27 and/or by the introduction of a medium (gas, liquid, etc.) between the lower surface 20 of the base plate 7 and the bottom surface 18 of the magnetic support ring 8.

The floating state may be attained not only by the force of the magnets or by introducing of one of these media, but also by a combination of these two support systems. The lifting and arresting magnets 27, 23 augmented by the media admitted under pressure through nozzles 12 provided with connectors 14 from the exterior into the gap 16 between the lower surface 20 of the base plate 7 and the bottom surface 18 of the magnetic support ring 8 cause the base plate 7, 7' to rise and dampen its vertical movement.

The weight of the entire clamping device 1 including any workpieces or structural units on the clamping tray 2, the vertical components of operating forces as well as the vertical components of tilting moments resulting from horizontal adjustments of the base plate 7, 7' are absorbed by the lifting magnets 27 and/or by the cushion of any medium within the gap 16.

Gaskets 13, preferably of the pre-stressed kind, are provided to seal the gap 16 so that the medium may become immediately effective within the gap 16 without escaping from the outer periphery of the base plate 7, 7'.

Controlled input and outflow of the medium (gas, liquid, etc.) into the gaps 16 or 32 between the base plate 7, 7' and the magnetic support ring 8 may also take place into the free space or chamber 31 through nozzles 11 placed around the periphery of the magnetic support ring which results in substantially equal pressures in the gaps 16 and 32. A gasket 30 will prevent the escape of medium through the gap 32.

In this alternative structure of the input and outflow of the medium (gas, liquid, etc.) the weight of the entire clamping device 1 in its floating state, including workpieces or structural units on the clamping tray 2, any vertical components of operational forces as well as vertical components of tilting moments resulting from horizontal movement of the base plate 7, 7' is absorbed by the lifting magnets 27 and/or any medium in the gaps 16 and 32.

There are, accordingly, sufficient degrees of freedom for the base plate 7, 7' within the magnetic retention ring 8 to ensure that the entire clamping device 1 may be moved and positioned in accordance with technological requirements.

Figure 6:
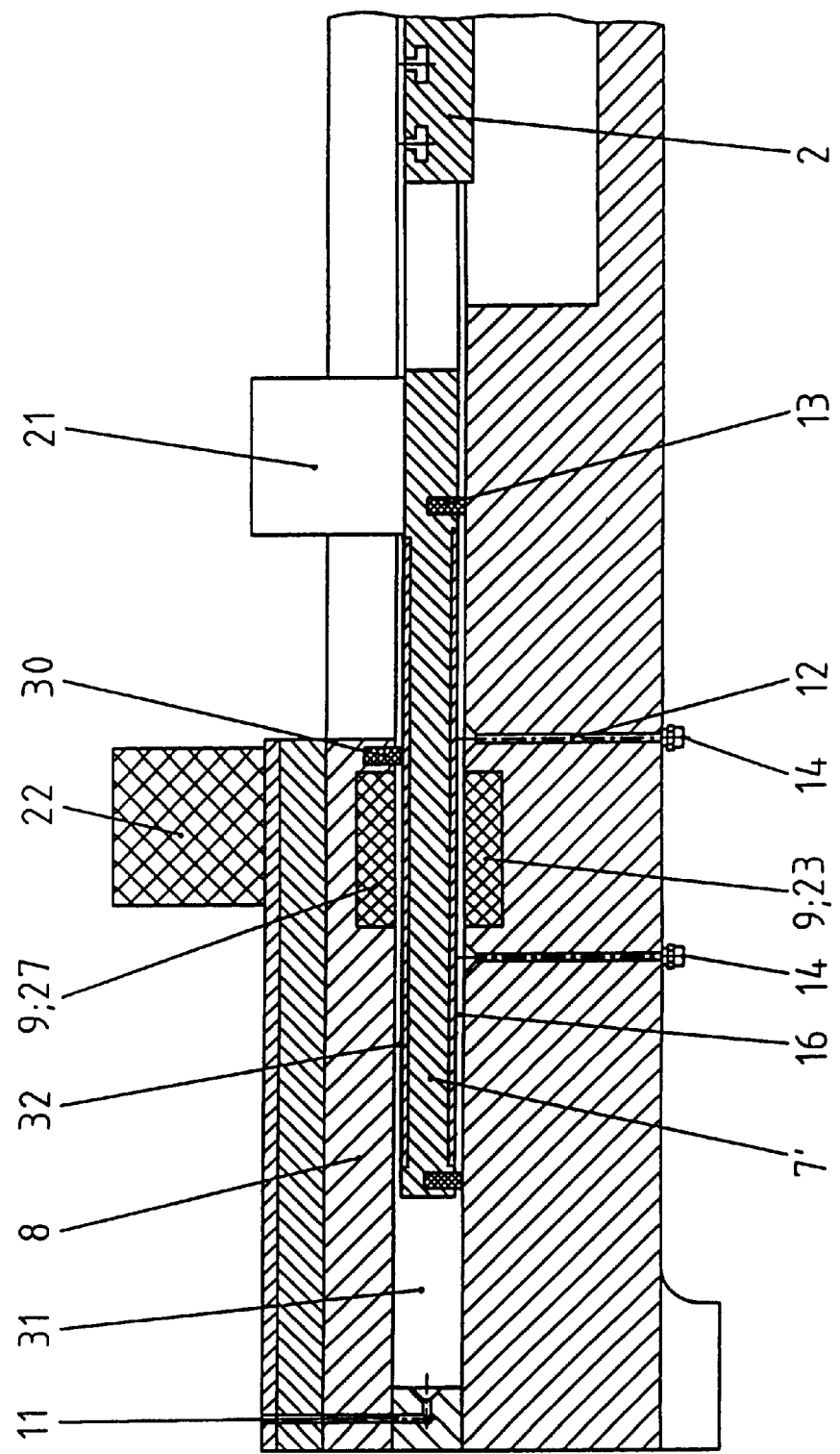
FIG. 6 Is a partial view on an enlarged scale of the structure shown in FIG. 5.

In the embodiment of the clamping device 1 depicted in FIG. 5, the base plate 7' is structured as a ring. It also shows disposition within the magnetic support ring 8 and the relationship between the base plate 7' and the clamping tray 2. The base plate 7' is supported in the magnetic support ring 8 in substantially the same manner as has previously been described in connection with base plate 7. It is to be noted that the level clamping tray 2 may be vertically adjusted relative to the base plate 7' by the ball spindle 4. The structure of the angular adjustment device 15 is substantially as has been described supra connecting the clamping tray 2 with the base plate 7', so that the rotational and planar adjustments previously described may be made by the base plate 7' independently of the angular adjustment device 15. The direct rigid connection of the angular adjustment device 15 in the clamping device 1 does not affect its function since its components are still capable of adjusting and arresting the clamping tray 2 in any desired vertical position. The structure of the base plate 7' has been selected so that, as shown in FIG. 6, as a support for movable tool systems 21 it can be adjusted in the direction of the y axis 24, the x axis 25, rotationally symmetric in direction 26 as well as, to the extent of the height of the gap, in the direction of the z axis 28.

Figure 7:
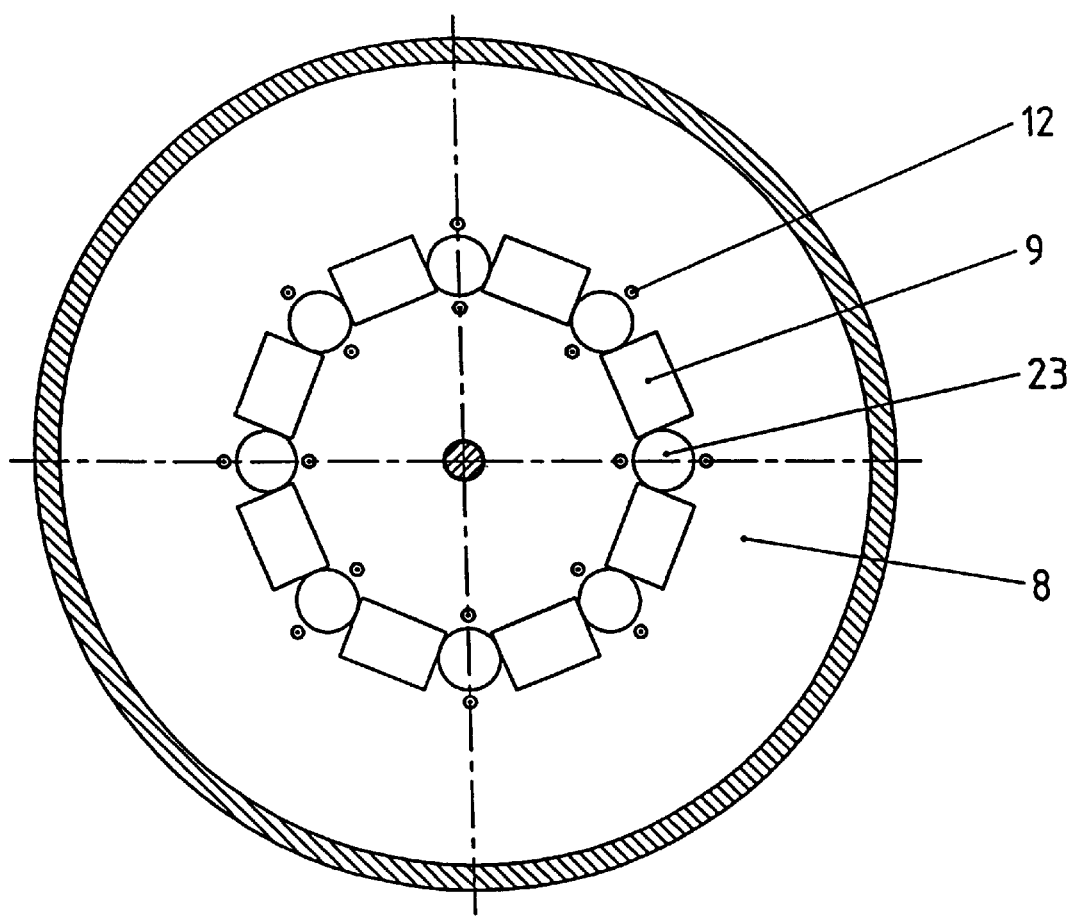
FIG. 7 is a top elevational view schematically depicting the arrangement of the retaining magnets and the drive magnets in the magnetic support ring.

A preferred structure and arrangement of the drive magnets 9 and of the arresting magnets 23 in the bottom surface of the magnetic support ring 8 is shown in the sectional view of FIG. 7. Those skilled in the art will know, however, that other arrangements are feasible as well.

As regards the functional cycle it is to be mentioned that owing to the extensive variability of the system, workpieces to be processed and/or structural units to be assembled or disassembled placed on the clamping tray 2 may be vertically adjusted at a precision in the pm range relative to tools, processing, assembly or disassembly systems mounted either on the machine portal 10 or stationarily and concentrically around the clamping tray 2. Depending upon technological dictates the adjustment may be repeated as often as necessary for each workpiece relative to each tool system. This applies also to positioning and adjusting of tool, processing, assembly and disassembly systems 21 mounted on the base plate 7' as regards their rotational and planar adjustment relative to workpieces and/or structural units placed on the clamping tray 2.

While a workpiece is being worked upon the base plate 7' is in its lowered position, i.e., it rests upon the inner bottom surface 18 of the magnetic support ring 8 against which it is secured by means of the energized arresting magnets 23 in order to prevent movement of the workpieces during the operation. Alternatively, it may be in a floating state as a result of the energized lifting magnets 27 and/or any medium (gas, liquid, etc.) pumped into the gaps 16, 32 through appropriate nozzles 11, 12 to be moved at a precision in the $\mu$m range by the drive magnets 9 acting upon the base plate 7' along a curve generated by a combination of rotational and planar movements in accordance with the technological requirements for the processing of the workpieces.

Vertical movements of the base plate 7' which may result from gravitation, tilting moments and operating forces are controlled by the lifting magnets 27 and/or absorbed by the pressurized medium. Defined spaces between the base plate 7' and the upper surface 17 as well as the bottom surface 18 of the magnetic support ring 8 are controlled and adjusted by a sensorized control system in a manner which prevents any contact between the base plate 7' and the magnetic support ring 8. The medium is controlled correspondingly, for instance by being fed into or removed from the gaps 16, 32.

Rotational and/or planar movement of the base plate 7' in its floating condition is provided by the lifting magnets 27 and by the drive magnets 9. The latter are preferably structured as linear motors. Movement may take place from one position on the clamping tray 2 to a next one followed by a controlled setting down of the base plate 7' and its arresting by the arresting magnets 23 while maintaining the new position in the magnetic support ring 8. However, it is also possible to process the workpieces while the base plate 7' is moving in the gap between the lower surface 20 of the base plate 7' and the bottom surface 18 of the magnetic support ring 8 along a curve. The precision of the curve is within the $\mu$m range.

The individual magnets may be controlled in such a manner that the lifting magnets 27, for instance, on the basis of ferromagnetic forces of attraction form and maintain an air gap 32 between the upper surface 17 of the magnetic support ring 8 and the upper surface 19 of the base plate 7'. The gap 16 between the lower surface 20 of the base plate 7' and the bottom surface 18 of the magnetic support ring 8 may be similarly formed and maintained. The selected arrangements and structures of the magnets ensure that the magnetic forces of the arresting magnets 23 and of the lifting magnets 27 during their actuation is provided at their operational points substantially without power. Thus the floating clamping device 1 or the base plate 7' may be moved rotationally and in a plane, as well as positioned, without additional moving elements such as toothed rack, spindles and the like, with or without additional media such as a gas or a liquid or the like.

Figure 8:
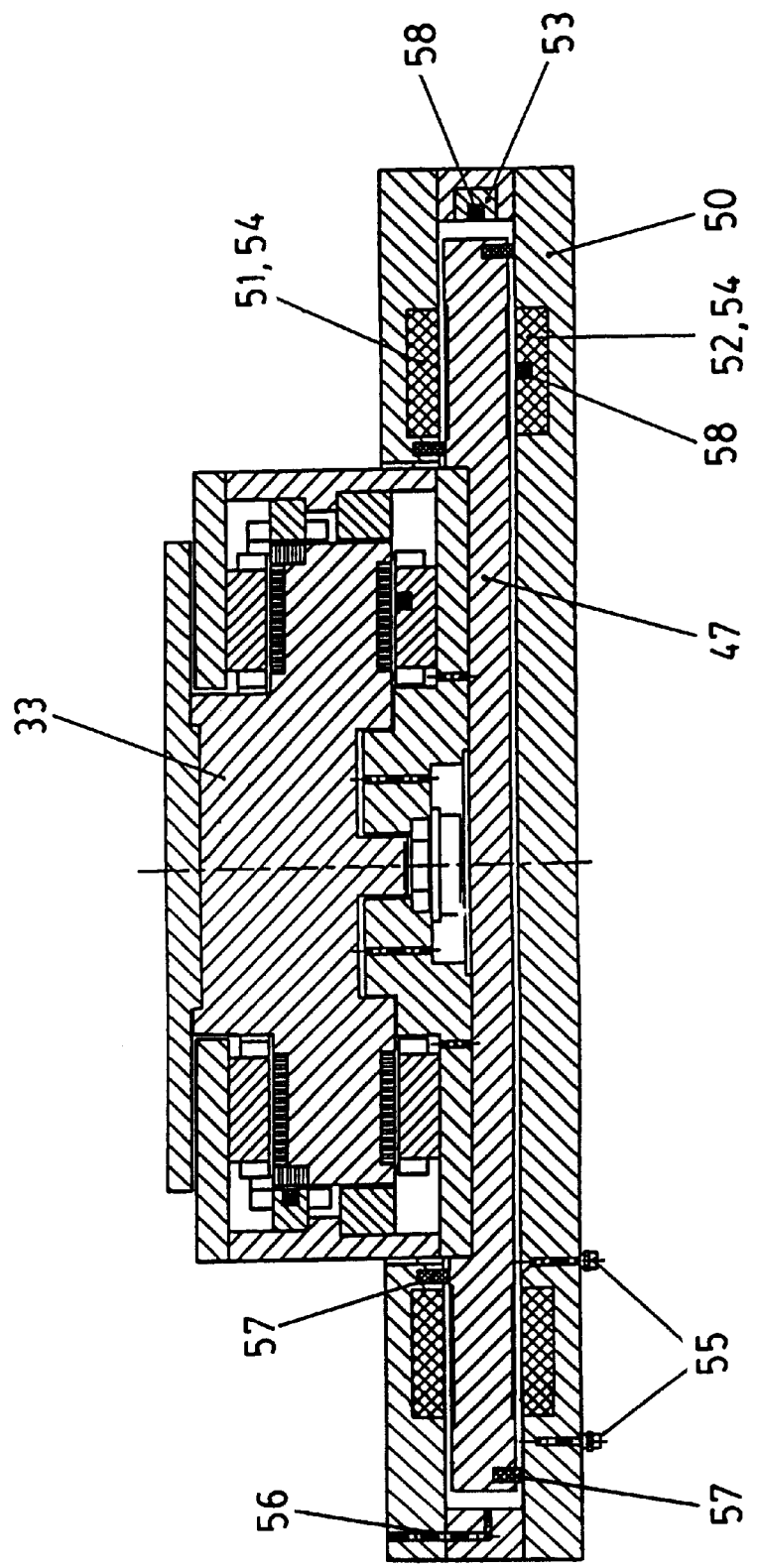
FIG. 8 is a view in axial section of the arrangement of the turntable on the turntable support.

FIG. 8 schematically shows a combination of the turntable 33 of FIG. 3 and a turntable support 47 within a mechanical guide structure 50. As may be seen, the turntable support 47, in a manner similar to the rotor 34 (FIG. 3), is maintained in a defined manner within the structure 50, and is surrounded by magnetic gaps, by support, arresting and centering magnets 51, 52, 53, and it may be moved by drive magnets 54 in the x direction 25 (FIG. 1). It is possible to lower the turntable support 47 in the guide structure 50 by means of the arresting magnets 52 and securely to arrest it by a magnetic force.

Gaseous or liquid media may be introduced through conduits 55, 56 to raise the turntable support 47 including the turntable 33 within the structure 50 and to establish a gas and/or liquid cushion between the turntable support 47 and the guide structure 50.

Gaskets 57 are provided substantially to prevent an escape of the gas and/or the liquid from the mechanical guide structure 50.

The position of the turntable support 47 in the mechanical guide structure 50 is determined by sensors 58 and is moved under closed-loop control with the turntable 33 (FIG. 1).

The essential advantages of the invention reside in the arrangement of a plurality of tool, processing, assembly and/or disassembly systems etc. at a machine portal and/or concentrically around the entire apparatus for mechanically processing workpieces and/or for assembling or disassembling structural units. In particular, a multiple processing center may be created, expanded by combining processing and assembly operations, while saving a number of individual machines or assembly stations. For instance, the turntable on the turntable support may be moved touchlessly, noiselessly and without requiring lubrication, with workpieces secured on its clamping tray, along a transfer path or assembly line. Highly precise movements in the x, y, z and ($\varphi$ directions are accomplished by this combination, and peripheral machinery and/or assembly units need execute complementary movement only.

Other advantages are achieved by mounting the workpieces and structural units on supports which may be selectively subjected either to a floating state without physical contact with other machine structures or to a securely clamped arrangement. The apparatus in accordance with the invention, because of its versatility, obviates the need for additional processing and treatment machines as well as transfer mechanisms.

The touchless movements provided for by the apparatus in accordance with the invention result in substantially no wear and tear and obviate the need for lubricants and lubrication stations. This, in turn, leads to an extended service life of the machine, reduced maintenance and costs.

Further advantages are derived from the fact that the apparatus in accordance with the invention requires no refitting and since positioning and placing of workpieces can be accomplished more quickly, idle times of the apparatus are significantly reduced.

An annularly structured base plate 7' may be utilized as a tool support system or as a robot support system for assembly or disassembly operations and may be moved around the clamping tray 2 to provide for processing of workpieces or for assembly or disassembly operations in a flexible and efficient manner. In such an arrangement, the base plate 7' will be moved as described supra.

The manner in which tool or assembly or disassembly systems 21 are mounted on the base plate 7' and the arrangement or disposition of fixed tool or assembly or disassembly systems 22 on the magnetic support ring 8 is also depicted in FIG. 6.

What is claimed is:

1. An apparatus for aligning a work piece relative to a tool for mechanical processing thereby, comprising:
   a housing forming a chamber comprising a bottom wall, a side wall and a top wall;
   a support mounted within the chamber in spaced-apart relationship relative to the bottom, side and top wall;
   a tray mounted on the support for securely holding the work piece;
   selectively energizable magnetic means mounted in one of the chamber and the support to provide relative movement between the support and the chamber along at least three orthogonal axes; and
   means for selectively introducing a pressurized fluid medium into the chamber for maintaining the support in a predetermined orientation therein.

2. The apparatus of claim 1, further comprising selectively energizable magnetic means for rotating the support within the chamber.

3. The apparatus of claim 1, further comprising means for selectively tilting the tray relative to the support.

4. The apparatus of claim 3, wherein the tray is connected to the support by a ball and socket joint and wherein at least two selectively extensible members are provided between the support and the tray laterally offset from each other and the ball and socket joint.

5. The apparatus of claim 2, wherein the chamber and the support are of substantially circular cross section.

6. The apparatus of claim 5, wherein the support is made at least in part of magnetically responsive material and wherein the magnetic means are mounted in the chamber in the bottom, side and top walls thereof.

7. The apparatus of claim 6, wherein the means for introducing the fluid medium comprises at least one nozzle in at least one of the bottom, side and top walls of the chamber.

8. The apparatus of claim 2, wherein the means for rotating the support comprises a plurality of selectively energizable magnets mounted in at least one of the bottom and top walls of the chamber.

9. The apparatus of claim 8, wherein the magnets comprise circularly effective linear motors.

10. The apparatus of claim 1, wherein the selectively energizable magnets comprise hybrid magnets.

11. The apparatus of claim 2, further comprising means for measuring at least one of the rotational displacement and velocity of the support.

12. The apparatus of claim 1, further comprising means for measuring the spacing between the support and the chamber.

* * * * *